(12) United States Patent
Gali et al.

(10) Patent No.: US 12,049,253 B2
(45) Date of Patent: *Jul. 30, 2024

(54) VEHICULAR TRAILER GUIDANCE SYSTEM

(71) Applicant: Magna Electronics Inc., Auburn Hills, MI (US)

(72) Inventors: Jyothi P. Gali, Rochester Hills, MI (US); Clarence P. McElroy, Grand Blanc, MI (US); Timothy M. Phillips, Fenton, MI (US); Theodore J. Church, Ortonville, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/171,443

(22) Filed: Feb. 20, 2023

(65) Prior Publication Data
US 2023/0202563 A1 Jun. 29, 2023

Related U.S. Application Data

(63) Continuation of application No. 17/248,419, filed on Jan. 25, 2021, now Pat. No. 11,584,439, which is a
(Continued)

(51) Int. Cl.
*B62D 13/06* (2006.01)
*B60Q 9/00* (2006.01)
(Continued)

(52) U.S. Cl.
CPC ............. *B62D 15/029* (2013.01); *B60Q 9/00* (2013.01); *B60R 1/26* (2022.01); *B60R 1/27* (2022.01);
(Continued)

(58) Field of Classification Search
CPC ........ B62D 15/02; B62D 13/06; B62D 13/00; B62D 9/005; B60D 1/36; G05D 1/00;
(Continued)

(56) References Cited

U.S. PATENT DOCUMENTS 5,502,640 A * 3/1996 Yagyu ................ G01C 21/3446
701/533
5,550,677 A 8/1996 Schofield et al.
(Continued)

*Primary Examiner* — Yuri Kan
(74) *Attorney, Agent, or Firm* — HONIGMAN LLP

(57) ABSTRACT

A vehicular trailer guidance system includes an electronic control unit (ECU), a rear backup camera and a trailer camera disposed at a rear portion of a trailer hitched to the vehicle. A display screen is disposed in the vehicle and viewable by a driver of the vehicle. With the trailer hitched to the vehicle, the display screen is operable to display video images derived from image data captured by the trailer camera. At least in part via processing at the ECU of image data captured by the trailer camera, an instruction that aids maneuvering the vehicle in reverse with the trailer hitched thereto during a reversing maneuver of the vehicle and trailer is generated. During the reversing maneuver of the vehicle and trailer, the display screen displays an alert when angling of the trailer relative to the vehicle approaches a jackknife condition.

38 Claims, 6 Drawing Sheets

Related U.S. Application Data continuation of application No. 16/166,197, filed on Oct. 22, 2018, now Pat. No. 10,899,385.

(60) Provisional application No. 62/575,653, filed on Oct. 23, 2017.

(51) Int. Cl.
| | | |
|---|---|---|
| *B60R 1/00* | (2022.01) | |
| *B60R 1/26* | (2022.01) | |
| *B60R 1/27* | (2022.01) | |
| *B62D 15/02* | (2006.01) | |
| *G06K 9/00* | (2022.01) | |
| *G06V 20/20* | (2022.01) | |
| *G06V 20/56* | (2022.01) | |
| *H04N 5/225* | (2006.01) | |
| *H04N 5/247* | (2006.01) | |
| *H04N 23/53* | (2023.01) | |
| *H04N 23/54* | (2023.01) | |
| *H04N 23/90* | (2023.01) | |

(52) U.S. Cl.
CPC ........... *B62D 15/028* (2013.01); *G06V 20/20* (2022.01); *G06V 20/56* (2022.01); *H04N 23/53* (2023.01); *H04N 23/54* (2023.01); *H04N 23/90* (2023.01); *B60R 2300/105* (2013.01); *B60R 2300/30* (2013.01); *B60R 2300/607* (2013.01); *B60R 2300/8086* (2013.01)

(58) Field of Classification Search
CPC .... G05D 1/02; B60R 1/00; B60R 1/27; B60R 1/26; G06K 9/00; B62Q 1/48; G01C 21/34; G06V 20/56; G06V 20/20; G06V 20/593; H04N 5/232; H04N 23/53; H04N 23/60; H04N 23/57; H04N 23/66; H04N 23/651; B60Q 9/008; G06T 7/60; G06T 7/80; G08G 1/168; G08G 1/16; G06F 3/005
See application file for complete search history.

(56) References Cited

U.S. PATENT DOCUMENTS

| | | | |
|---|---|---|---|
| 5,670,935 A | 9/1997 | Schofield et al. | |
| 5,949,331 A | 9/1999 | Schofield et al. | |
| 6,690,268 B2 | 2/2004 | Schofield et al. | |
| 8,874,317 B2 | 10/2014 | Marczok et al. | |
| 9,085,261 B2 | 7/2015 | Lu et al. | |
| 10,160,382 B2 * | 12/2018 | Pliefke | B62D 13/06 |
| 10,638,025 B2 * | 4/2020 | Gali | B62D 13/00 |
| 10,899,385 B2 * | 1/2021 | Gali | B60R 1/00 |
| 11,240,427 B2 * | 2/2022 | Koravadi | H04N 23/60 |
| 11,310,407 B2 * | 4/2022 | Sauer | H04N 23/57 |
| 11,393,217 B2 * | 7/2022 | Sabeti | B60Q 9/008 |
| 11,483,514 B2 * | 10/2022 | Van Dan Elzen | H04N 23/66 |
| 11,584,439 B2 * | 2/2023 | Gali | G06V 20/20 |
| 11,600,011 B2 * | 3/2023 | Gupta | G06T 7/60 |
| 11,618,383 B2 * | 4/2023 | Karas | G08G 1/168 |
| | | | 348/148 |
| 11,618,442 B2 * | 4/2023 | Viehmann | B62D 9/005 |
| | | | 701/23 |
| 11,627,389 B2 * | 4/2023 | Koravadi | H04N 23/651 |
| | | | 348/118 |
| 11,639,134 B1 * | 5/2023 | Huizen | H04N 23/56 |
| | | | 348/77 |
| 11,657,537 B2 * | 5/2023 | Singh | G06T 7/80 |
| | | | 348/148 |
| 11,657,620 B2 * | 5/2023 | Diessner | G08G 1/16 |
| | | | 382/103 |
| 11,676,404 B2 * | 6/2023 | Singh | G06V 20/593 |
| | | | 348/148 |
| 11,827,152 B2 * | 11/2023 | Gieseke | G06F 3/005 |
| 2008/0312792 A1 * | 12/2008 | Dechamp | B62D 13/06 |
| | | | 701/41 |
| 2009/0236825 A1 * | 9/2009 | Okuda | B60D 1/36 |
| | | | 280/477 |
| 2010/0274474 A1 * | 10/2010 | Takano | B62D 15/0275 |
| | | | 701/532 |
| 2013/0314503 A1 * | 11/2013 | Nix | G06K 9/00805 |
| | | | 348/46 |
| 2014/0085472 A1 | 3/2014 | Lu et al. | |
| 2014/0160276 A1 | 6/2014 | Pliefke et al. | |
| 2015/0002670 A1 | 1/2015 | Bajpai | |
| 2015/0149040 A1 * | 5/2015 | Hueger | B62D 15/028 |
| | | | 701/41 |
| 2015/0197281 A1 * | 7/2015 | Miller | B60D 1/245 |
| | | | 701/41 |
| 2015/0217693 A1 | 8/2015 | Pliefke et al. | |
| 2015/0344028 A1 | 12/2015 | Gieseke et al. | |
| 2016/0023601 A1 * | 1/2016 | Windeler | B62D 15/0275 |
| | | | 348/118 |
| 2017/0015312 A1 | 1/2017 | Latotzki | |
| 2017/0017848 A1 | 1/2017 | Gupta et al. | |
| 2017/0050672 A1 * | 2/2017 | Gieseke | B62D 13/06 |
| 2017/0217372 A1 | 8/2017 | Lu et al. | |
| 2017/0253237 A1 | 9/2017 | Diessner | |
| 2017/0254873 A1 | 9/2017 | Koravadi | |
| 2017/0317748 A1 | 11/2017 | Krapf | |
| 2017/0329346 A1 | 11/2017 | Latotzki | |
| 2017/0349213 A1 * | 12/2017 | Abdel-Rahman | B62D 15/025 |
| 2018/0211528 A1 | 7/2018 | Seifert | |
| 2018/0215382 A1 | 8/2018 | Gupta et al. | |
| 2018/0253608 A1 | 9/2018 | Diessner et al. | |
| 2018/0276838 A1 | 9/2018 | Gupta et al. | |
| 2018/0276839 A1 | 9/2018 | Diessner et al. | |
| 2019/0016264 A1 | 1/2019 | Potnis et al. | |
| 2019/0064831 A1 * | 2/2019 | Gali | B60W 10/18 |
| 2019/0121351 A1 * | 4/2019 | Niewiadomski | G05D 1/0225 |
| 2019/0297233 A1 | 9/2019 | Gali et al. | |

* cited by examiner

VEHICULAR TRAILER GUIDANCE SYSTEM

CROSS REFERENCE TO RELATED APPLICATIONS

The present application is a continuation of U.S. patent application Ser. No. 17/248,419, filed Jan. 25, 2021, now U.S. Pat. No. 11,584,439, which is a continuation of U.S. patent application Ser. No. 16/166,197, filed Oct. 22, 2018, now U.S. Pat. No. 10,899,385, which claims the filing benefits of U.S. provisional application Ser. No. 62/575,653, filed Oct. 23, 2017, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle to assist in maneuvering the vehicle with a trailer attached at the vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. It is also known to use cameras to assist in hitching a vehicle to a trailer and/or in determining a trailer angle of a trailer relative to a vehicle. Examples of such known systems are described in U.S. Pat. Nos. 9,085,261 and/or 6,690,268, which are hereby incorporated herein by reference in their entireties.

SUMMARY OF THE INVENTION

The present invention provides a trailer maneuver assist system for a vehicle that utilizes one or more cameras to capture image data representative of images exterior and rearward of the vehicle and trailer towed by the vehicle, and to provide instructions and displays to assist the driver of the vehicle in maneuvering the vehicle and trailer along a determined path of travel and toward a target location. The system displays a bird's-eye view image of the vehicle and trailer and area rearward of the trailer and the user selects a target location or indicates a desired path of travel of the vehicle and trailer. The system displays iconistic representations of the vehicle and trailer and of the vehicle steering wheel to provide instructions to the driver of the vehicle as to which way to turn the steering wheel (and how much to turn the steering wheel) to maneuver the vehicle and trailer along a selected path toward a target destination. The system may generate an alert when the trailer angle exceeds a threshold amount so that the driver of the vehicle can avoid a jackknife condition. The system thus provides dynamic guidance to the driver of the vehicle during the reversing maneuver of the vehicle and trailer to assist the driver in maneuvering the vehicle to follow the selected path toward the target or destination location.

These and other objects, advantages, purposes and features of the present invention will become apparent upon review of the following specification in conjunction with the drawings.

DESCRIPTION OF THE PREFERRED EMBODIMENTS

A vehicle and trailer maneuver guidance system and/or driving assist system operates to capture image data of the scene exterior of the vehicle and trailer being towed by the vehicle and may process the captured image data to determine a path of travel for the vehicle and trailer and to detect objects at or near the vehicle and in the predicted or selected path of the vehicle, such as to assist a driver of the vehicle in maneuvering the vehicle and trailer in a rearward direction. The vision system includes an image processor or image processing system that is operable to receive image data from one or more cameras and may provide an output to a display device for displaying images representative of the captured image data. The vision system provides display, such as a rearview display or a top down or bird's eye or surround view display or the like, of images derived from the captured image data and with iconistic representations of the trailer and/or vehicle and/or vehicle steering wheel to assist the driver in maneuvering the vehicle and trailer, such as during a reversing maneuver.

Figure 1:
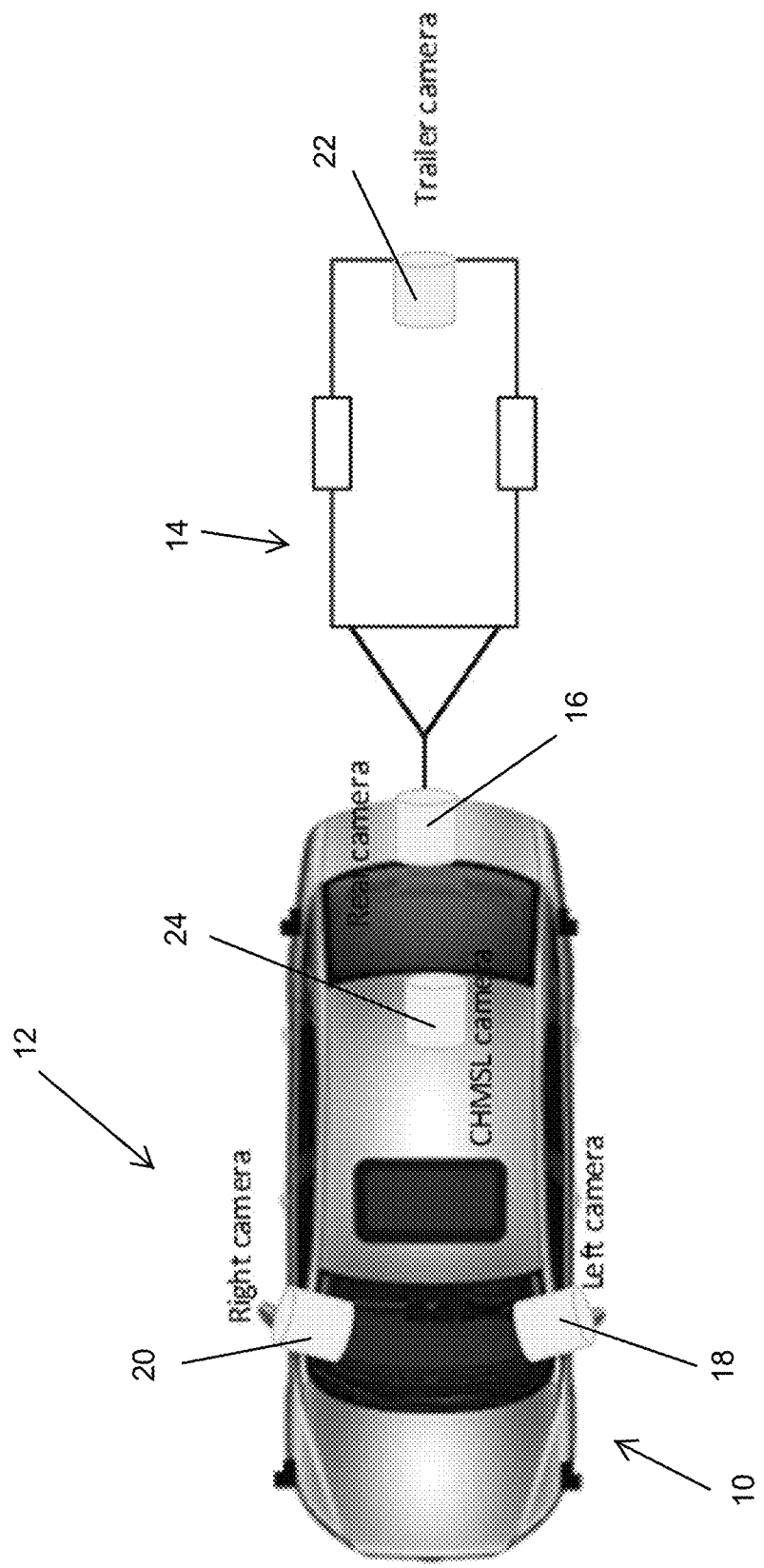
FIG. 1 is a plan view of a vehicle with a trailer maneuver assist system that is operable to control or guide the vehicle and to reverse the vehicle and trailer toward and into a selected location in accordance with the present invention.
Figure 2:
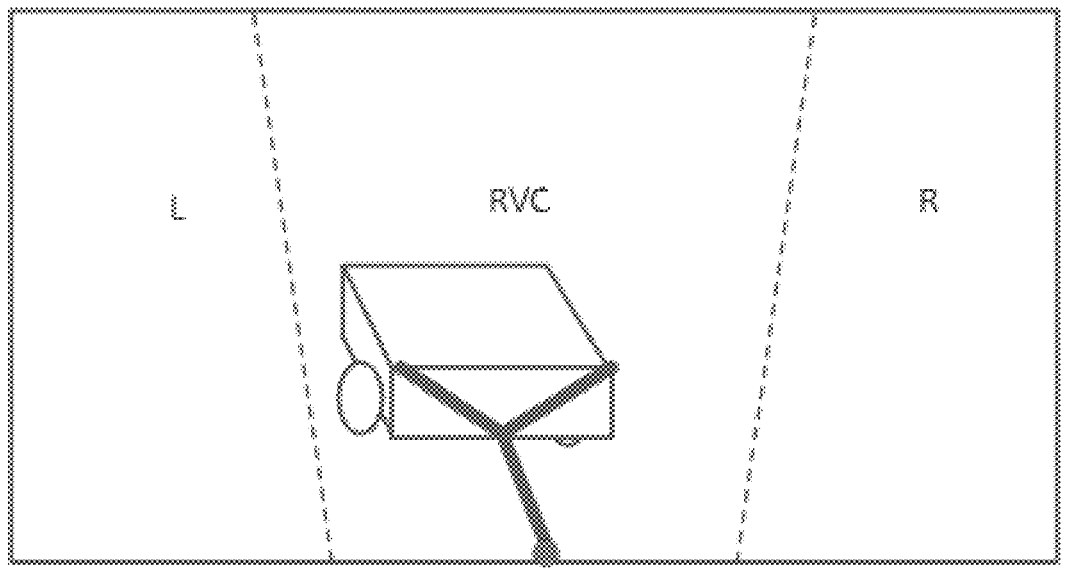
FIG. 2 is a displayed image based on image data captured by a left side camera, a rear camera and a right side camera, showing the trailer behind the vehicle.
Figure 3:
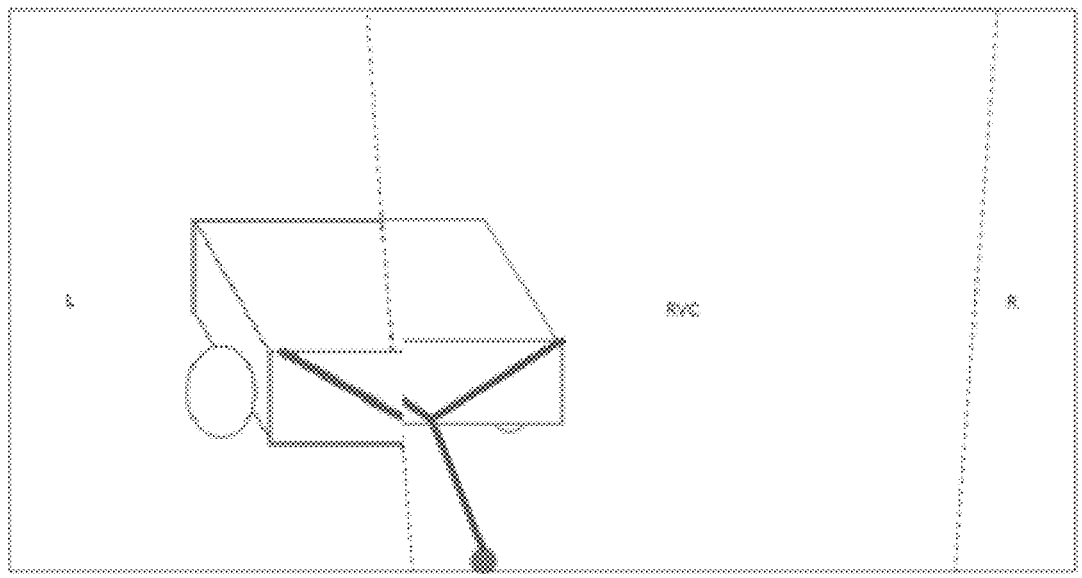
FIG. 3 is a displayed image similar to FIG. 2, showing the trailer behind and turning toward the left side of the vehicle.
Figure 4:
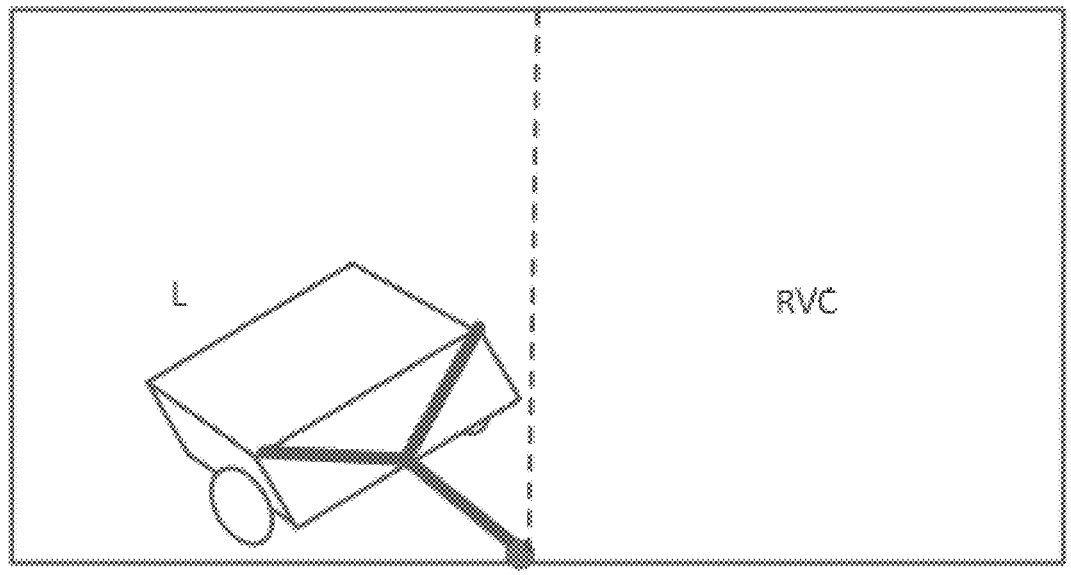
FIG. 4 is a displayed image similar to FIG. 3, showing the trailer behind and turning more toward the left side of the vehicle.
Figure 5:
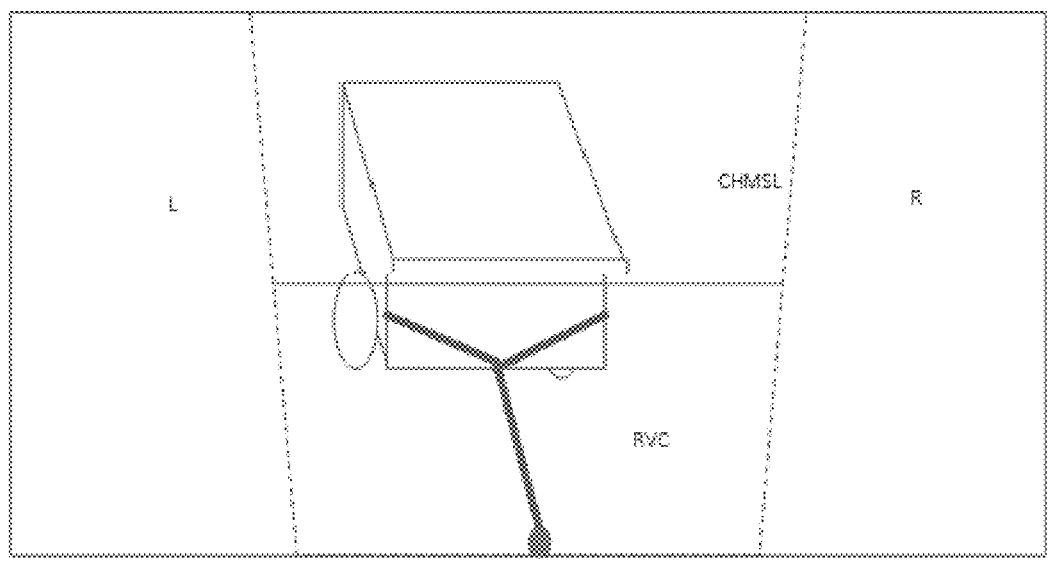
FIG. 5 is a displayed image based on image data captured by a left side camera, a rear backup camera, a rear CHMSL camera and a right side camera, showing the trailer behind the vehicle.
Figure 8:
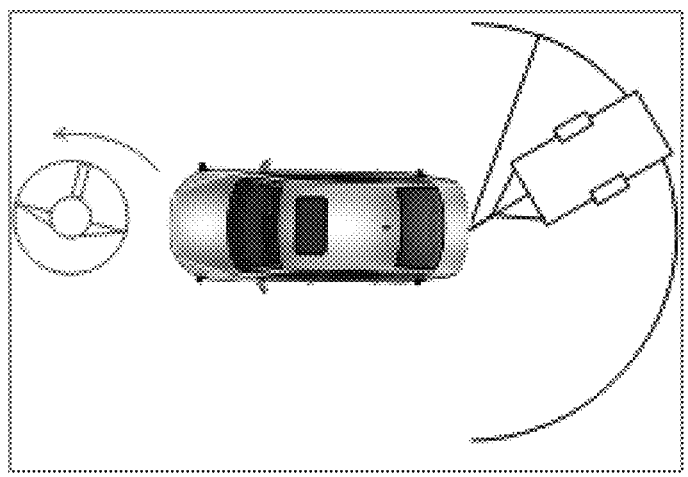
FIGS. 6-10 are display images showing a top view of the vehicle and trailer and showing the trailer angle and different zones of trailer angles, and showing a steering wheel with directional arrows to instruct the driver of the vehicle to turn the steering wheel to maneuver the vehicle and trailer along the selected path.
Figure 7:
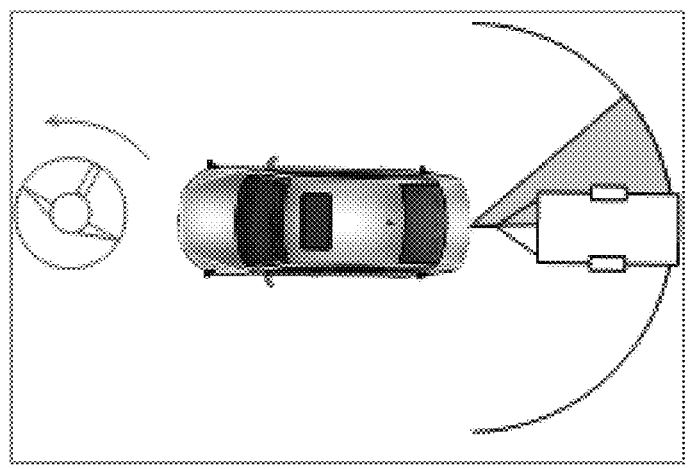
Figure 6:
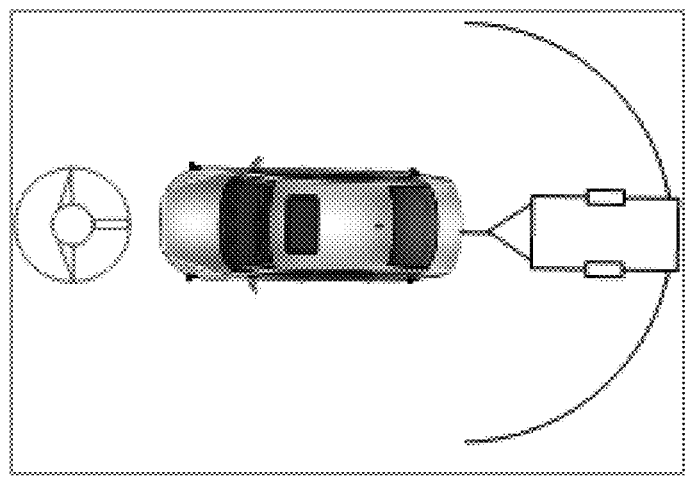
Figure 9:
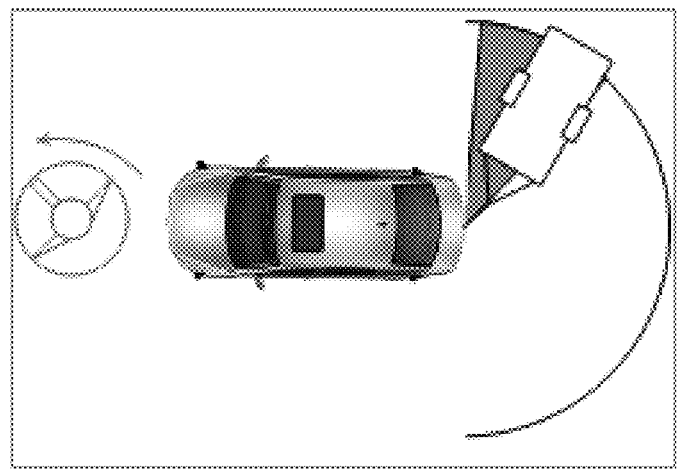
Figure 10:
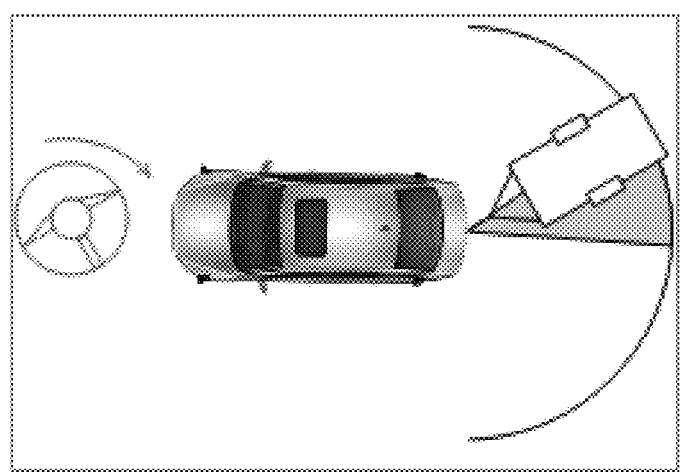

Referring now to the drawings and the illustrative embodiments depicted therein, a vehicle 10 includes a trailer maneuver guidance system 12 that is operable to guide the driver in maneuvering the vehicle 10 and trailer 14 toward a desired or selected location. The trailer maneuver guidance system 12 includes at least one exterior viewing vehicle-based imaging sensor or camera, such as a rearward viewing imaging sensor or camera 16 (and the system may optionally include multiple exterior viewing imaging sensors or cameras, such as a sideward/rearward viewing camera 18, 20 at respective sides of the vehicle), and a rearward viewing trailer-based camera 22, which capture image data representative of the respective scene exterior of the vehicle and trailer and in the respective field of view, with the cameras each having a lens for focusing images at or onto an imaging array or imaging plane or imager of the cameras (FIG. 1). The rear camera may comprise a rear backup camera (disposed at or near a rear bumper of the vehicle) or a CHMSL (center high mounted stop lamp) located camera or other high-mounted camera disposed at an upper region of the vehicle and viewing rearward of the vehicle. Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like).

The trailer maneuver guidance system 12 includes a control or electronic control unit (ECU) or processor that is operable to process image data captured by the camera or cameras and may detect objects or the like and/or provide displayed images at a display device for viewing by the driver of the vehicle (the control and/or display device may be part of or incorporated in or at an interior rearview mirror assembly of the vehicle, or the control and/or the display device may be disposed elsewhere at or in the vehicle). The data transfer or signal communication from the cameras (including the trailer camera) to the ECU may comprise any suitable data or communication link, such as a vehicle network bus or the like of the equipped vehicle. The image data captured by the trailer camera may be wirelessly communicated to a receiver at the vehicle and communicated from the receiver to the ECU (such as via the vehicle network bus or the like) or the receiver may be at or part of the ECU.

The system of the present invention is operable to provide safe guidance to the user while driving a vehicle with a trailer attached, especially when backing up the vehicle with the trailer. The system generates and displays images or views that follow the trailer continuously, with the views generated to assist the user in avoiding any collisions. The system provides sound/display/haptic alerts when the trailer is nearer to another object or vehicle to avoid trailer and vehicle or truck or object collision. The system displays the position of the trailer with respect to the towing vehicle, and the system provides dynamic guidance to the user during a reversing maneuver with the trailer to reach his/her destination point.

The system provides active trailer views (see FIGS. 2-5) and uses trailer angle detection or determination for seamless and continuous trailer view panning. The feature generates trailer panoramic views (TPV) by embedding images derived from image data captured by the rear view camera and CHMSL camera between images derived from image data captured by the opposite side view cameras to avoid any blind spots. The system provides the option of a slide to pan or swipe to pan the trailer panoramic views. The system also or otherwise provides a digital zoom in/out option.

As shown in FIGS. 6-10, the system displays the true trailer angle with a jackknife overlay and/or with different zones of turning angles to warn the driver when the trailer is approaching a jackknife condition. For example, the display may display zones that encompass trailer angles of a particular range, such as 15 degrees or 30 degrees or 22.5 degrees or the like, whereby the driver, when viewing the displayed images and overlayed or superimposed zones, can readily discern an estimation of the angle of the trailer relative to the vehicle, and can readily see if the trailer angle is approaching an angle close to or indicative of a trailer jackknifing condition. The system estimates the direction of the trailer based on the direction and angle of the towing vehicle steering wheel angle, and the system provides the projected direction of the trailer during backup. The system also displays the jackknife zones of the trailer, and may provide a jackknife warning (FIG. 10, where the zone may be shown in red and/or flashed or otherwise highlighted) when the trailer is at or approaching or in a potential jackknife situation. As shown in FIGS. 6-10, the system displays a top down view of the vehicle and trailer (and may display an avatar of a vehicle and trailer), showing the trailer angle during the driving maneuver. Optionally, for example, the zones (see FIGS. 7 and 9) near the center (where the trailer may be angled less than 15 degrees relative to the vehicle) may be shown in green, with further angled zones (see FIG. 8) being displayed in yellow and jackknifing zones (see FIG. 10) displayed in red. The display may include an iconistic representation of a steering wheel of the vehicle with steering directions to instruct the driver as to which direction to turn the steering wheel in order to steer and maneuver the vehicle and trailer along the selected path.

The system is operable to determine or estimate the width of the trailer via processing of image data captured by one or more of the vehicle cameras. The system may also determine or estimate the height of the trailer via processing of image data captured by one or more of the vehicle cameras. The system may also determine or estimate the length of the trailer via processing of image data captured by one or more of the vehicle cameras.

The system provides sound/display alerts and/or haptic feedback when the trailer is closer to any object including the towing vehicle during the reversing maneuver. The system provides "see through trailer" views by displaying images derived from image data captured by a trailer mounted camera (such as the trailer camera 22 in FIG. 1), when such a camera is available at back of the trailer. The camera may be fixed at the back of the trailer or may comprise a remote camera.

Figure 11:
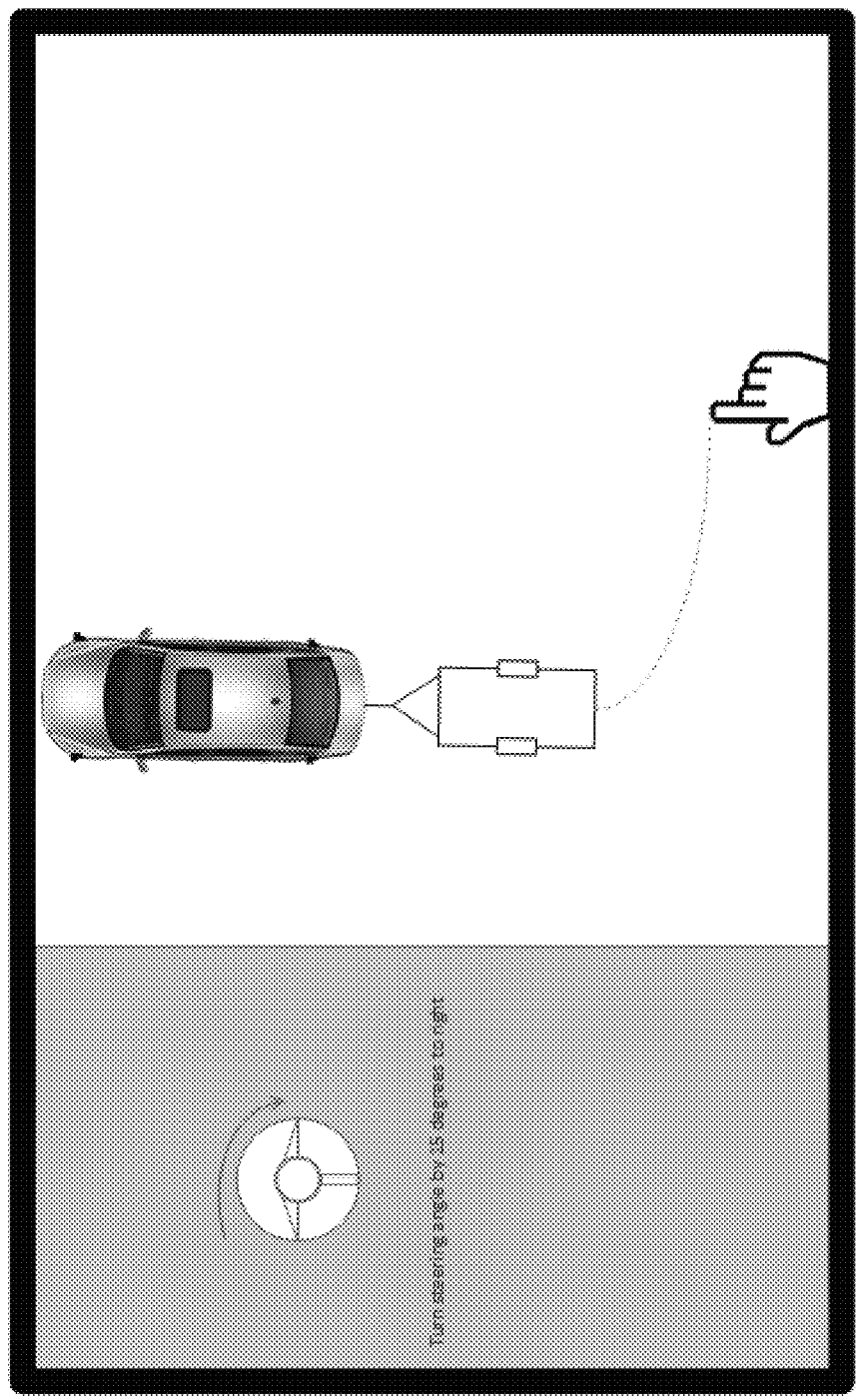
FIG. 11 is a view of the scene map and top view of the vehicle and trailer as displayed by a display screen to allow the user to select or indicate a desired path of travel of the vehicle and trailer, with the display including a steering wheel with directional arrows and/or text instructions to instruct the driver of the vehicle to turn the steering wheel to maneuver the vehicle and trailer along the selected path.

Optionally, and such as shown in FIG. 11, the system allows the user to select a trailer destination location at the display screen (such as at a center stack display or at an instrument cluster display), which displays the vehicle and trailer and the surroundings via a trailer top view. The system allows the user to draw a path towards the destination location, and allows the user to hold onto a camera position relative to the trailer in which the user wants to direct the trailer. The system plans the path with calculated way points to reach the user-selected location.

The system guides the user by providing instructions as to the amount of steering angle rotation and speed required to at each way point along the path so as to maneuver the vehicle and trailer toward and to the destination location. For example, the system may display a representation of the steering wheel and may provide instructions such as, for example, "turn steering angle by 15 degrees to the right" or the like. Optionally, the system may generate an alert or indication or feedback responsive to determination that the driver has steered or turned the steering wheel the appropriate amount in the appropriate direction.

The system plans the path in such way that the trailer never enters into the Jackknife zones. The system suggests an alternative path if the path selected by the user is not possible for the trailer maneuver because of any reason, such as obstructions or terrain or curves or the like.

The system automatically selects the views based on the way points and the relative position of the trailer with respect to the towing vehicle. The system generates a trailer top view (FIG. 11) with/without a camera at back of the trailer.

Optionally, the system may integrate the vehicle and trailer position with a navigation map system of the vehicle.

The system provides haptic feedback and/or visual cues when the driver turns the steering wheel and it arrives at the instructed steering wheel position, when the trailer is moving or turning in the correct direction vs. wrong direction, when the speed of the vehicle is appropriate or inappropriate (e.g., too fast for the turns in the path), and/or when the vehicle and/or trailer arrive at the designated way points. Thus, the driver is informed via such cues or alerts throughout the reversing maneuver and as the driver steers and controls the vehicle correctly or incorrectly to follow the target path.

The visual cues that the system may provide include an overlay for the desired steering angle value with the actual steering angle at each of the way points, or an overlay for the speed required to travel along the path (e.g., an overlay indicating to the driver to stop, slow down, or accelerate). Optionally, the system may provide dynamic calculation of waypoints when the user misses a current or determined way point. The system may provide overlays to indicate the success (or failure) in reaching the way points and/or destination. The system may display the projected trailer position based on the current speed and steering angle of the vehicle steering wheel.

Therefore, the system of the present invention displays views showing the trailer angle relative to the vehicle and provides instructions to the driver as to how much to turn the steering wheel so that the trailer and vehicle follow a target path to a desired or target destination. The system may provide alerts when the trailer is off-target and/or when the trailer is approaching a jackknife condition, such that the driver can correct the steering and maneuver the vehicle and trailer toward the target destination.

The system may utilize aspects of the trailering or trailer angle detection systems or trailer hitch assist systems described in U.S. Pat. Nos. 9,085,261 and/or 6,690,268, and/or U.S. Publication Nos. US-2018-0276839; US-2018-0276838; US-2018-0253608; US-2018-0215382; US-2018-0211528; US-2017-0254873; US-2017-0217372; US-2017-0050672; US-2015-0217693; US-2014-0160276; US-2014-0085472 and/or US-2015-0002670, and/or U.S. patent applications, Ser. No. 16/110,575, filed Aug. 23, 2018 and published Feb. 28, 2019 as U.S. Publication No. US-2019-0064831, and/or Ser. No. 16/033,416, filed Jul. 12, 2018, now U.S. Pat. No. 10,532,698, and/or U.S. provisional application Ser. No. 62/685,309, filed Jun. 15, 2018, which are hereby incorporated herein by reference in their entireties.

The system may utilize aspects of the parking assist systems described in U.S. Pat. No. 8,874,317 and/or U.S. Publication Nos. US-2017-0329346; US-2017-0317748; US-2017-0253237; US-2017-0050672; US-2017-0017847; US-2017-0015312 and/or US-2015-0344028, which are hereby incorporated herein by reference in their entireties.

The cameras or sensors may comprise any suitable cameras or sensors. Optionally, one or more of the cameras may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ™ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271;

US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication No. WO 2011/090484 and/or U.S. Publication Nos. US-2017-0276788; US-2017-0254873; US-2017-0222311 and/or US-2010-0245066, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing a forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailer guidance system, the vehicular trailer guidance system comprising:
   an electronic control unit (ECU) disposed at a vehicle, the ECU comprising a processor;
   a rear backup camera disposed at a rear portion of the vehicle and viewing at least rearward of the vehicle;
   wherein the rear backup camera comprises an imaging array having at least one million photosensor elements arranged in rows and columns;
   a trailer camera disposed at a rear portion of a trailer hitched to the vehicle, wherein the trailer camera views at least rearward of the trailer;
   a display screen disposed in the vehicle and viewable by a driver of the vehicle;
   wherein, with the trailer hitched to the vehicle, the display screen is operable to display video images derived from image data captured by the trailer camera, and wherein the displayed video images comprise video images of a region exterior of the trailer that includes an area rearward of the trailer hitched to the vehicle;
   wherein the display screen is operable to display video images derived from image data captured by the rear backup camera;
   wherein, at least in part via processing at the ECU of image data captured by the trailer camera, an instruction that aids the driver in maneuvering the vehicle in reverse with the trailer hitched thereto during a reversing maneuver of the vehicle and the trailer is generated, and wherein the instruction is visually displayed at the display screen during the reversing maneuver of the vehicle and the trailer;
   wherein the generated instruction pertains to steering of the vehicle by the driver during the reversing maneuver of the vehicle and the trailer to control the vehicle to follow a path of travel of the vehicle and the trailer; and
   wherein, during the reversing maneuver of the vehicle and the trailer, the display screen displays an alert when an angle of the trailer relative to the vehicle approaches a jackknife condition.

2. The vehicular trailer guidance system of claim 1, wherein the vehicular trailer guidance system, at least via processing at the ECU of image data captured by the trailer camera, detects objects along the path of travel of the vehicle and the trailer.

3. The vehicular trailer guidance system of claim 1, wherein the vehicular trailer guidance system displays at the display screen zones of trailer angles relative to the vehicle, and wherein, during the reversing maneuver of the vehicle and the trailer, the driver of the vehicle, viewing the displayed zones of trailer angles relative to the vehicle, is made aware of the angle of the trailer relative to the vehicle.

4. The vehicular trailer guidance system of claim 1, wherein the generated instruction guides the driver of the vehicle during the reversing maneuver.

5. The vehicular trailer guidance system of claim 4, wherein the vehicular trailer guidance system determines waypoints along the path of travel of the vehicle and the trailer and provides an instruction to the driver for maneuvering the vehicle and the trailer in reverse from a waypoint along the path of travel toward a next waypoint along the path of travel.

6. The vehicular trailer guidance system of claim 4, wherein the generated instruction pertains to turning a steering wheel of the vehicle.

7. The vehicular trailer guidance system of claim 6, wherein the generated instruction includes an iconistic representation of the steering wheel and a directional arrow indicating a direction the driver is to turn the steering wheel to maneuver the vehicle and the trailer during the reversing maneuver.

8. The vehicular trailer guidance system of claim 7, wherein the generated instruction includes text.

9. The vehicular trailer guidance system of claim 6, wherein the generated instruction pertains to a direction to turn the steering wheel of the vehicle during the reversing maneuver.

10. The vehicular trailer guidance system of claim 9, wherein the generated instruction pertains to an amount for the driver to turn the steering wheel of the vehicle in the indicated direction during the reversing maneuver.

11. The vehicular trailer guidance system of claim 9, wherein the generated instruction instructs the driver of the vehicle to turn the steering wheel clockwise or counterclockwise.

12. The vehicular trailer guidance system of claim 1, wherein the generated instruction is generated responsive to the driver selecting a target path from a start point in the video images displayed at the display screen to an end point in the displayed video images.

13. The vehicular trailer guidance system of claim 12, wherein the display screen comprises a touch sensor screen, and wherein the driver selects the target path by touching the display screen and moving his or her finger over the video images displayed at the display screen.

14. The vehicular trailer guidance system of claim 1, wherein the rear backup camera is part of a plurality of vehicle cameras, and wherein the plurality of vehicle cameras includes (i) a driver-side vehicle camera disposed at a driver side of the vehicle and viewing at least sideward of the vehicle and (ii) a passenger-side vehicle camera disposed at a passenger side of the vehicle and viewing at least sideward of the vehicle.

15. A vehicular trailer guidance system, the vehicular trailer guidance system comprising:
   an electronic control unit (ECU) disposed at a vehicle, the ECU comprising a processor;
   a rear backup camera disposed at a rear portion of the vehicle and viewing at least rearward of the vehicle;
   wherein the rear backup camera comprises an imaging array having at least one million photosensor elements arranged in rows and columns;
   a trailer camera disposed at a rear portion of a trailer hitched to the vehicle, wherein the trailer camera views at least rearward of the trailer;
   a display screen disposed in the vehicle and viewable by a driver of the vehicle;
   wherein, with the trailer hitched to the vehicle, the display screen is operable to display video images derived from image data captured by the trailer camera, and wherein the displayed video images comprise video images of a region exterior of the trailer that includes an area rearward of the trailer hitched to the vehicle;
   wherein the display screen is operable to display video images derived from image data captured by the rear backup camera;
   wherein, at least in part via processing at the ECU of image data captured by the trailer camera, an instruction that aids the driver in maneuvering the vehicle in reverse with the trailer hitched thereto during a reversing maneuver of the vehicle and the trailer is generated, and wherein the instruction is visually displayed at the display screen during the reversing maneuver of the vehicle and the trailer;
   wherein the generated instruction guides the driver of the vehicle during the reversing maneuver of the vehicle and the trailer to control the vehicle to follow a path of travel of the vehicle and the trailer;
   wherein the vehicular trailer guidance system displays at the display screen zones of trailer angles relative to the vehicle, and wherein, during the reversing maneuver of the vehicle and the trailer, the driver of the vehicle, viewing the displayed zones of trailer angles relative to the vehicle, is made aware of an angle of the trailer relative to the vehicle; and
   wherein, during the reversing maneuver of the vehicle and the trailer, the display screen displays an alert when the angle of the trailer relative to the vehicle approaches a jackknife condition.

16. The vehicular trailer guidance system of claim 15, wherein the vehicular trailer guidance system, at least in part via processing at the ECU of image data captured by the trailer camera, detects objects along the path of travel of the vehicle and the trailer.

17. The vehicular trailer guidance system of claim 15, wherein the vehicular trailer guidance system determines waypoints along the path of travel of the vehicle and the trailer and provides an instruction to the driver for maneuvering the vehicle and the trailer in reverse from a waypoint along the path of travel toward a next waypoint along the path of travel.

18. The vehicular trailer guidance system of claim 15, wherein the generated instruction pertains to turning a steering wheel of the vehicle.

19. The vehicular trailer guidance system of claim 18, wherein the generated instruction includes an iconistic representation of the steering wheel and a directional arrow indicating a direction the driver is to turn the steering wheel to maneuver the vehicle and the trailer during the reversing maneuver.

20. The vehicular trailer guidance system of claim 15, wherein the generated instruction includes text.

21. The vehicular trailer guidance system of claim 15, wherein the generated instruction pertains to a direction to turn the steering wheel of the vehicle during the reversing maneuver.

22. The vehicular trailer guidance system of claim 21, wherein the generated instruction pertains to an amount for the driver to turn the steering wheel of the vehicle in the indicated direction during the reversing maneuver.

23. The vehicular trailer guidance system of claim 21, wherein the generated instruction instructs the driver of the vehicle to turn the steering wheel clockwise or counterclockwise.

24. The vehicular trailer guidance system of claim 15, wherein the generated instruction is generated responsive to the driver selecting a target path from a start point in the video images displayed at the display screen to an end point in the displayed video images.

25. The vehicular trailer guidance system of claim 24, wherein the display screen comprises a touch sensor screen, and wherein the driver selects the target path by touching the display screen and moving his or her finger over the video images displayed at the display screen.

26. The vehicular trailer guidance system of claim 15, wherein the rear backup camera is part of a plurality of vehicle cameras, and wherein the plurality of vehicle cameras includes (i) a driver-side vehicle camera disposed at a driver side of the vehicle and viewing at least sideward of the vehicle and (ii) a passenger-side vehicle camera disposed at a passenger side of the vehicle and viewing at least sideward of the vehicle.

27. A vehicular trailer guidance system, the vehicular trailer guidance system comprising:
   an electronic control unit (ECU) disposed at a vehicle, the ECU comprising a processor;
   a rear backup camera disposed at a rear portion of the vehicle and viewing at least rearward of the vehicle;

wherein the rear backup camera comprises an imaging array having at least one million photosensor elements arranged in rows and columns;

a trailer camera disposed at a rear portion of a trailer hitched to the vehicle, wherein the trailer camera views at least rearward of the trailer;

a display screen disposed in the vehicle and viewable by a driver of the vehicle;

wherein, with the trailer hitched to the vehicle, the display screen is operable to display video images derived from image data captured by the trailer camera, and wherein the displayed video images comprise video images of a region exterior of the trailer that includes an area rearward of the trailer hitched to the vehicle;

wherein the display screen is operable to display video images derived from image data captured by the rear backup camera;

wherein, at least in part via processing at the ECU of image data captured by the trailer camera, an instruction that aids the driver in maneuvering the vehicle in reverse with the trailer hitched thereto during a reversing maneuver of the vehicle and the trailer is generated, and wherein the instruction is visually displayed at the display screen during the reversing maneuver of the vehicle and the trailer;

wherein the generated instruction guides the driver of the vehicle during the reversing maneuver of the vehicle and the trailer to control the vehicle to follow a path of travel of the vehicle and the trailer;

wherein the vehicular trailer guidance system detects objects along the path of travel of the vehicle and the trailer; and wherein, during the reversing maneuver of the vehicle and the trailer, the display screen displays an alert when an angle of the trailer relative to the vehicle approaches a jackknife condition.

28. The vehicular trailer guidance system of claim 27, wherein the vehicular trailer guidance system detects the objects along the path of travel of the vehicle and the trailer, at least in part via processing at the ECU of image data captured the trailer camera.

29. The vehicular trailer guidance system of claim 27, wherein the vehicular trailer guidance system determines waypoints along the path of travel of the vehicle and the trailer and provides an instruction to the driver for maneuvering the vehicle and the trailer in reverse from a waypoint along the path of travel toward a next waypoint along the path of travel.

30. The vehicular trailer guidance system of claim 27, wherein the generated instruction pertains to turning a steering wheel of the vehicle.

31. The vehicular trailer guidance system of claim 30, wherein the generated instruction includes an iconistic representation of the steering wheel and a directional arrow indicating a direction the driver is to turn the steering wheel to maneuver the vehicle and the trailer during the reversing maneuver.

32. The vehicular trailer guidance system of claim 27, wherein the generated instruction includes text.

33. The vehicular trailer guidance system of claim 27, wherein the generated instruction pertains to a direction to turn the steering wheel of the vehicle during the reversing maneuver.

34. The vehicular trailer guidance system of claim 33, wherein the generated instruction pertains to an amount for the driver to turn the steering wheel of the vehicle in the indicated direction during the reversing maneuver.

35. The vehicular trailer guidance system of claim 33, wherein the generated instruction instructs the driver of the vehicle to turn the steering wheel clockwise or counterclockwise.

36. The vehicular trailer guidance system of claim 27, wherein the rear backup camera is part of a plurality of vehicle cameras, and wherein the plurality of vehicle cameras includes (i) a driver-side vehicle camera disposed at a driver side of the vehicle and viewing at least sideward of the vehicle and (ii) a passenger-side vehicle camera disposed at a passenger side of the vehicle and viewing at least sideward of the vehicle.

37. The vehicular trailer guidance system of claim 27, wherein the generated instruction is generated responsive to the driver selecting a target path from a start point in the video images displayed at the display screen to an end point in the displayed video images.

38. The vehicular trailer guidance system of claim 37, wherein the display screen comprises a touch sensor screen, and wherein the driver selects the target path by touching the display screen and moving his or her finger over the video images displayed at the display screen.

* * * * *